Patented Oct. 30, 1951

2,573,448

UNITED STATES PATENT OFFICE 2,573,448

SULFUR DYESTUFFS AND PROCESS OF MAKING SAME

Ernst Jenny, Basel, Switzerland

No Drawing. Application December 27, 1948, Serial No. 67,577. In Switzerland January 15, 1948

2 Claims. (Cl. 260—138)

It is known that various sulfur dyestuffs can be made by sulfurizing 1:8- or 1:5-dinitronaphthalene on a mixture of these two compounds. For example, a dyestuff yielding violet-red tints can be obtained from 1:5-dinitronaphthalene, without any special after-treatment, by sulfurizing in the presence of a zinc salt (see U. S. Patent No. 674,137).

According to the present invention unexpectedly valuable sulfur dyestuffs are made by heating with a solution of caustic alkali for at least 5 hours a sulfurization product obtained by treating practically pure 1:5-dinitronaphthalene, that is to say 1:5-dinitronaphthalene which may contain at most 5 per cent. of 1:8-dinitronaphthalene, with a solution of an alkali polysulfide at a temperature above 200° C. in the presence of a copper salt under conditions such that the resulting sulfurization product is free from iron.

The sulfurization product used as starting material in the present process may be obtained by sulfurizing technically pure 1:5-dinitronaphthalene or a 1:5-dinitronaphthalene containing no substantial quantity of 1:8-dinitronaphthalene, that is to say not more than 5 per cent. thereof. The sulfurization is carried out in the usual manner by means of a solution of sodium sulfide containing dissolved sulfur. It is essential to conduct the sulfurization in a vessel which does not lead to the introduction of iron into the sulfurization mixture.

The sulfurization is started at a moderate temperature, for example, ranging from 100° C. to 200° C., and is completed by a baking operation at a higher temperature, for example, up to 300° C.

In accordance with the invention the sulfurization product so obtained is heated with a solution of caustic alkali, especially one of relatively high concentration, for example, a sodium hydroxide solution of about 30 per cent strength. The use of potassium hydroxide is not more advantageous. The treatment may be carried out at a temperature of about 100° C. and advantageously above 100° C., for example, at the boiling point of the solution used.

The duration of the heat treatment is at least 5 hours and may be up to 24 hours. Too short a period of treatment incurs the risk that the desired reaction is not brought to completion and then may undergo retrogression by treatment with sodium sulfide.

When the reaction is finished the dyestuff may be isolated from the reaction mixture, for example, by acidification or by a similar method.

By the process of the invention there are obtained valuable sulfur dyestuffs yielding red-brown tints, which dyestuffs are in many cases distinguished from the known analogous dyestuffs by the color of their dyeings, especially the purity thereof, and the fastness properties of their dyeings, especially their fastness to light and washing.

The following examples illustrate the invention, the parts being by weight:

Example 1

Into 400 parts of a sodium tetrasulfide solution (prepared from 100 parts of sulfur and an aqueous sodium sulfide melt containing 80 parts of $Na_2S$) there are introduced at 120° C. firstly 16 parts of crystalline copper sulfate dissolved in a small quantity of water and then 46 parts of 1:5-dinitronaphthalene sufficiently slowly to cause but a moderately intense reaction to set in. The whole is stirred at an oil-bath temperature of 170–180° C. until the mass thickens, which is the case after about ½ hour. The melt is then baked on plates at 290–310° C. for 5 hours in a baking oven. A test portion of the melt so obtained dissolves in water with a brown-violet to violet-red coloration and dyes cotton blue-green tints from a bath containing sodium sulfide. The melt is then dissolved in water, filtered, if desired, and precipitated with sulfuric acid. The precipitated compound is separated by filtration and introduced in the form of a paste into 400 parts of caustic soda solution of 30 per cent strength, and the mixture is then boiled in a reflux apparatus for 30 hours.

The mixture is then diluted with water, and the resulting dyestuff is precipitated with hydrochloric acid or sulfuric acid, separated by filtration and dried. The dyestuff so obtained is a dark powder which dissolves in concentrated sulfuric acid with a brown-red coloration and dyes cotton from a sodium sulfide vat fast red-brown tints.

By using a smaller or larger quantity of copper sulfate in the melting process the tint of the dyestuff can be changed to some extent. By using a lower melting or baking temperature there are obtained dyestuffs yielding somewhat less pure tints.

Example 2

Into 400 parts of the polysulfide solution used in Example 1 there are introduced at 110–120° C. 16 parts of copper sulfate dissolved in a small quantity of water and then 44 parts of technically pure 1:5-dinitronaphthalene sufficiently slowly to cause but a moderately intense reaction to set in. The melt is stirred at an oil-bath temperature of 170–180° C. until it thickens, which is the case after about ½ hour. The melt is then baked on plates in a baking oven at a temperature of 290–310° C. for 5 to 8 hours. The melt is then ground and subjected to treatment with 400 parts of caustic soda solution of 30 per cent. strength for about 20–30 hours at the boiling temperature in a reflux apparatus. The mixture is then diluted and decanted, and the dyestuff is precipitated with hydrochloric acid or sulfuric acid, separated by filtration and dried. The dyestuff so obtained is a dark powder which dissolves in concentrated sulfuric acid with a brown-red coloration and dyes cotton from a sodium sulfide bath fast red-brown tints.

Having thus described the invention, what is claimed is:

1. In a process for the manufacture of sulfur dyestuffs from dinitronaphthalene, the improvements which consist in treating at a temperature above 200° C. a 1:5-dinitronaphthalene which may contain at most 5% of 1:8-dinitronaphthalene with a solution of an alkali polysulfide in the presence of a copper salt in an apparatus that does not yield iron to an alkali polysulfide solution and in treating the sulfurization product thus obtained for at least 5 hours with a hot solution of caustic alkali.

2. A sulfur dyestuff obtained according to the process of claim 1.

ERNST JENNY.

REFERENCES CITED

The following references are of record in the file of this patent:

UNITED STATES PATENTS

| Number | Name | Date |
| --- | --- | --- |
| 667,486 | Bohn | Feb. 5, 1901 |

FOREIGN PATENTS

| Number | Country | Date |
| --- | --- | --- |
| 11,276 | Great Britain | of 1895 |
| 19,271 | Great Britain | of 1900 |

Certificate of Correction

Patent No. 2,573,448                                      October 30, 1951

ERNST JENNY

It is hereby certified that error appears in the above numbered patent requiring correction as follows:

In the grant, lines 1 to 3, inclusive, for "Ernst Jenny, of Basel, Switzerland" read *Ernst Jenny, of Basel, Switzerland, assignor to Ciba Limited, of Basel, Switzerland, a Swiss firm,*; line 13, for "Ernst Jenny, his heirs" read *Ciba Limited, their heirs*; in the heading to the printed specification, line 4, for "Ernst Jenny, Basel, Switzerland" read *Ernst Jenny, Basel, Switzerland, assignor to Ciba Limited, Basel, Switzerland, a Swiss firm*; in the printed specification, column 1, line 3, for "on a" read *or a*;

and that the said Letters Patent should be read as corrected above, so that the same may conform to the record of the case in the Patent Office.

Signed and sealed this 26th day of February, A. D. 1952.

[SEAL]

THOMAS F. MURPHY,
*Assistant Commissioner of Patents.*